United States Patent [19]
Gatto et al.

[11] Patent Number: 5,387,785
[45] Date of Patent: Feb. 7, 1995

[54] DEVICE FOR ANALYZING INFORMATION CARRIERS, ESPECALLY GAMING COUPONS BY SUPERIMPOSING BLIND COLOR INFORMATION

[75] Inventors: Jean-Marie Gatto; Dominique Bertrand, both of Paris, France

[73] Assignee: International des Jeux, Boulogne, France

[21] Appl. No.: 117,975

[22] Filed: Sep. 7, 1993

[30] Foreign Application Priority Data

Sep. 7, 1992 [FR] France ............... 92 10642

[51] Int. Cl.[6] .......................................... G06K 7/10
[52] U.S. Cl. ............................. 235/454; 235/456
[58] Field of Search .......... 235/454, 455, 456, 451; 382/17, 61

[56] References Cited

U.S. PATENT DOCUMENTS

| | | | |
|---|---|---|---|
| 4,098,408 | 7/1978 | Auchinleck | 235/475 |
| 4,301,361 | 11/1981 | Lees | 235/484 |
| 4,365,151 | 12/1982 | Fasig et al. | 250/222 R |
| 4,724,307 | 2/1988 | Dutton | 235/455 |
| 4,795,894 | 1/1989 | Sugimoto | 235/468 |
| 4,963,726 | 10/1990 | Checchetti | 250/208.1 |
| 5,173,596 | 12/1992 | Kapinos | 235/475 |

FOREIGN PATENT DOCUMENTS

1000649 2/1989 Belgium .
2661529A1 10/1991 France .

*Primary Examiner*—Davis L. Willis
*Assistant Examiner*—Karl D. Frech
*Attorney, Agent, or Firm*—Sterne, Kessler, Goldstein & Fox

[57] ABSTRACT

A device for analyzing information carriers, particularly gaming coupons or receipts, includes a carrier receiver device, an image scanning device for reading the information on the carrier, a processing unit for processing the image information and for transmitting the information to a central gaming management unit. The carrier is printed with multiple colors. The image scanning device includes an optical reader which is blind to a single color, but sensitive to all other colors. The carrier has fixed marking patterns, printed in the color to which the image scanning device is blind, which delineate where the player marks the carrier with variable gaming information. The carrier also has fixed information for alignment and type designation printed in other colors. The processing unit uses stored marking patterns corresponding to the type of carrier analyzed, by superimposing blind color information.

10 Claims, 6 Drawing Sheets

First 5 Draws and Second 5 Draws on SATURDAY (160 F)
First 5 Draws on SATURDAY only (80 F) tick the box Official results and information on minitel 36.15 LOTO
and by telephone  36 65 77 01

6 out of 49

FIG.4

First 5 Draws and Second 5 Draws on SATURDAY (160 F)
First 5 Draws on SATURDAY only (80 F) tick the box

DEVICE FOR ANALYZING INFORMATION CARRIERS, ESPECALLY GAMING COUPONS BY SUPERIMPOSING BLIND COLOR INFORMATION

BACKGROUND OF THE INVENTION

1. 1Field of the Invention

The present invention relates to devices for capturing documents by analyzing information carriers. More particularly, the present invention relates to devices for analyzing gaming coupons or receipts.

2. Related Art

A number of games, especially lottery games, consist of the player completing a gaming coupon comprising a grid formed of boxes. The player places signs within these boxes to form a combination, on which he bets.

These gaming coupons are forwarded by the players to gaming offices equipped with gaming terminals. Receipts are delivered to the player in exchange for the coupons, together with an acknowledgement of the corresponding stake. The gaming terminals are generally equipped with analysis devices, or coupon and receipt readers, which make it possible to formulate coded signals transmitted to a central unit, where the bets of the players are stored in memory until the draw.

Conventional readers are of the type which utilize a global box-by-box analysis of the document, where the positive recognition of the signs placed on the gaming coupon corresponds with the player's bet. Such systems, however, are of relatively complex construction and correspondingly difficult to employ.

Moreover, when the gaming document, such as a coupon, is poorly completed by the player (for example, by poor alignment of the gaming signs in the corresponding boxes), the conventional systems are poor at validating the coupon. Similarly, these systems cannot always recognize certain documents, such as receipts, when they contain significant printing defects.

Another drawback of conventional systems is that they do not allow for detailed recognition of the signs written in by the players, such as crosses, circles, etc.

The invention aims to remedy the drawbacks of the conventional readers by creating a device for analyzing information carriers which, while being of relatively simple construction, ensures both the precise recognition and reading of the documents presented to it.

SUMMARY OF THE INVENTION

The invention is a device for analyzing information carriers, especially gaming coupons or receipts, comprising means for inserting the carrier; means for reading the information .on the carrier; and means for processing the information read from the carrier, with a view to its conversion into digital data and its transmission to a central gaming management unit.

The means for reading the information on the carrier comprise an optical reader, which is blind to a single color for the whole of the analysis, but is sensitive to other colors.

The coupon is printed in multiple colors. The marking pattern, which delineates were the player's marks (variable gaming information) may be made, is printed in the color to which the optical reader is blind (e.g. drop-out color). The variable gaming information and fixed information for aligning the coupon and for designating the type of game to which it belongs are printed in these other colors.

The processing means, comprise means of generating marking patterns corresponding to the type of game to which the coupon belongs, with a view to the reconstructing of the coupon's regions to be analyzed by superimposing on the variable data, fixed alignment, and game type data, fixed marking patterns data to which the image reader has been rendered blind.

The foregoing, and other features and advantages of the invention will be apparent from the following, more particular description of a preferred embodiment of the invention, as illustrated in the accompanying drawings.

DETAILED DESCRIPTION OF THE PREFERRED EMBODIMENTS

The preferred embodiments of tile invention are discussed in detail below. While specific part numbers and/or configurations are discussed, it should be understood that this is done for illustration purposes only. A person skilled in the relevant art will recognize that other components and configurations may be used without parting from the spirit and scope of the invention.

The preferred embodiments of the invention are now described with reference to the figures where like reference numbers indicate like elements.

Figure 1:
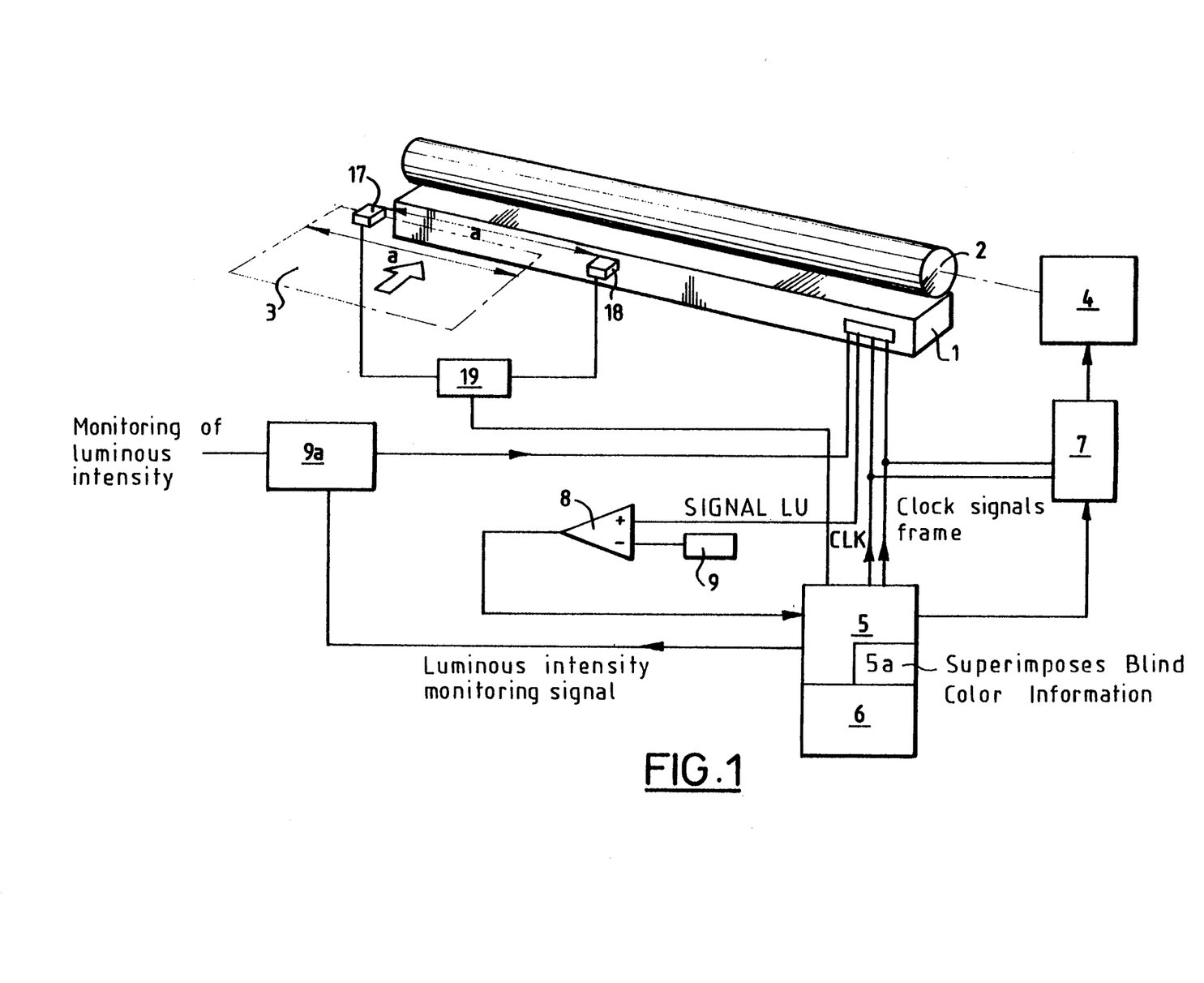
FIG. 1 is a schematic perspective view of the analysis device according to the invention.

The analysis device represented schematically in FIG. 1 includes, principally, an image detector 1 arranged opposite a roller 2 for driving a document 3 for analysis.

The roller 2 is linked to an electric stepper motor 4 intended to allow analysis of the document 3 through successive scanning lines. Vertical resolution is governed by the displacement step selected for the roller 2. The electric stepper motor 4 is controlled by a logic circuit 7.

A data processing unit 5, with a local memory 6, is connected to the image detector 1. The memory 6 is used for the temporary storage of the digital image data, prior to its transmission to a central gaming management unit (not represented).

A comparator 8 is connected between a data output of the image detector 1 and an input of the processing unit 5, for comparing a SIGNAL LU (generated by the image detector 1) with a reference signal (generated by a signal source 9). A circuit 9a, which monitors the luminous intensity, is also connected to the image detector 1 and the processing unit 5. The circuit 9a receives a luminous intensity monitoring signal from the processing unit 5. By this circuit arrangement, the processing unit 5 determines the appropriate light intensity for the processing.

Figure 2:
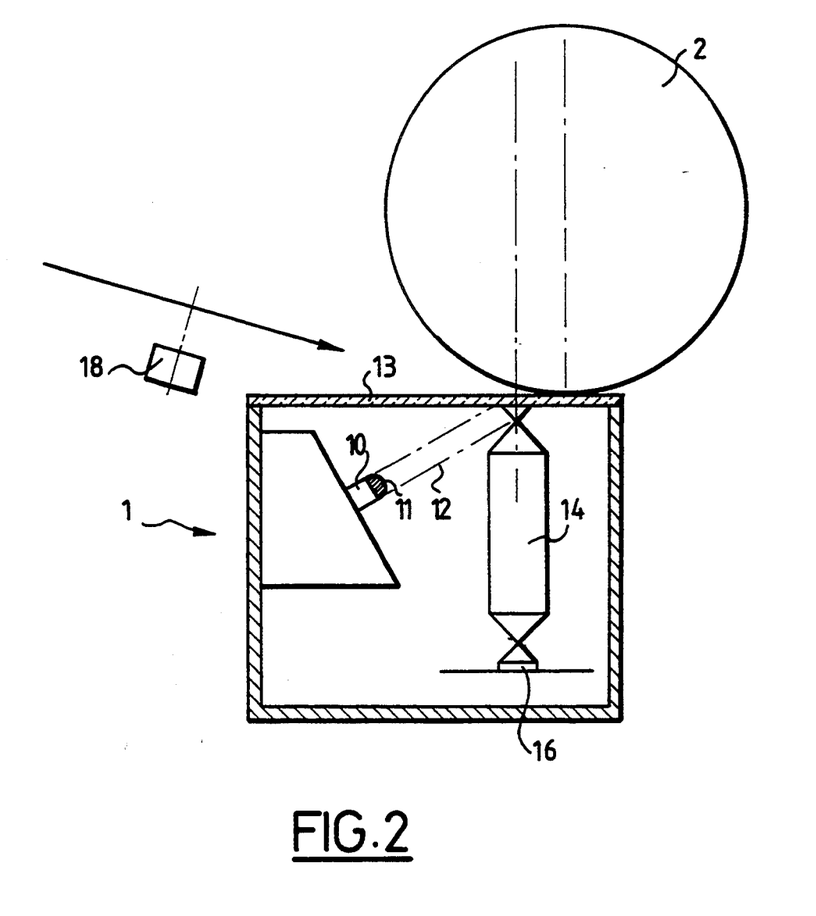
FIG. 2 is a schematic transverse sectional view of the device of FIG. 1.

As represented in FIG. 2, the image detector 1 includes a row of light-emitting diodes (LED) 10. The number of LED 10 in each row depends on the horizontal resolution and luminous intensity required by the application.

Members 11 are associated with the LED 10. The members 11 focus and filter beams of light emitted from LED 10 onto a transparent wall 13 of the image detector 1 housing.

The face of the document 3 is applied against the transparent wall 13 for analysis. Fixed inscriptions on the document 3, such as a gaming grid, grid box numerals, date, and other indications are printed in the same color as the light emitted by LED 10. Thus, these inscriptions are not be reproduced by the analysis device. In contrast, variable inscriptions (such as, signs or marks made by the player in tile gaming grid) and other inscriptions (such as, alignment tags, codes relating to the type of game to which the coupon belongs) are of a different color than that of the emitted light, and therefore are reproduced.

Opposite the region for focusing the beams emitted by the LED 10, are arranged light conductors 14 for transmitting the light beams onto photosensitive elements 16.

The plane of symmetry of the roller 2 and the optical axis of the light conductors 14 have a slight offset in the direction of insertion of the document 3. As the document 3 is inserted into the device, its front edge reflects the light emitted (monochromatic light) by the LED 10, thus conveying to the analysis device the presence of the document 3 at this location.

In this preferred embodiment, the members 11 are made in the form of thick plano-concave lenses. The concave faces on members 11 are designed with a curvature, such that the beam exiting a lens overlaps the beam exiting a neighboring lens. Thus, the light emitted by the set of LED 10 has the appearance of a continuous monochromatic luminous stroke for color (for example, the color red in this embodiment).

Correspondingly, all the parts of the document 3 printed in red do not appear in the image of the document 3 as given by the device, while the parts printed or bearing marks in other colors do appear.

The analysis device further includes detectors 17 and 18 (FIG. 1 and 2) arranged opposite the slot between the roller 2 and the image detector 1. Detectors 17 and 18 are placed at an axial distance from one another, which is slightly greater than the transverse dimension of the smallest document to be read. The outputs of these detectors are connected to the processing unit 5.

Such a layout makes it possible to distinguish between documents of different widths. A document of small width, such as a receipt, prompts the actuation of a single detector. Whereas, a document of greater width such as a gaming coupon, triggers two detectors. A circuit 19 indicates to the processing unit 5 the width of the document 3 present for the intervention of an appropriate processing program.

Figure 3:
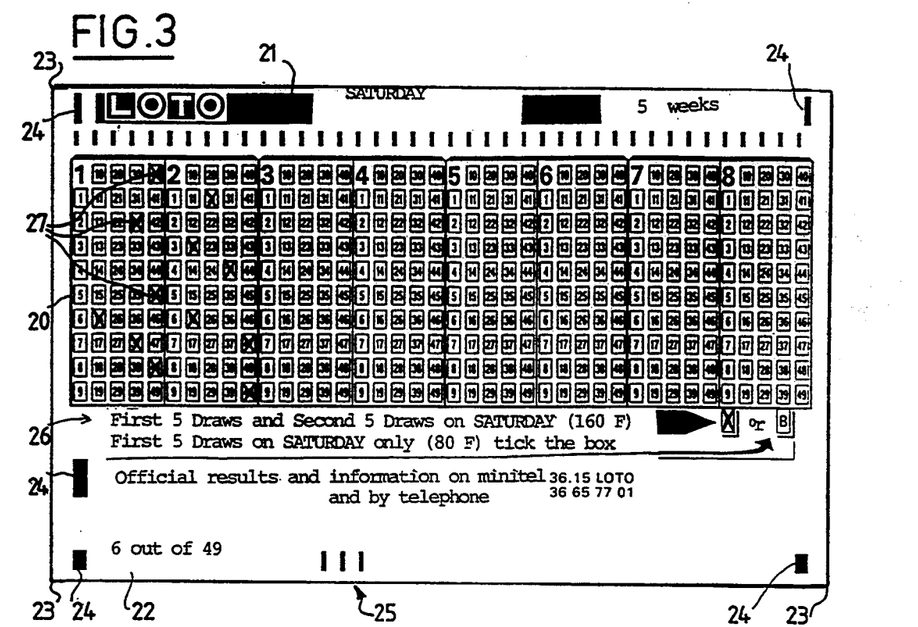
FIG. 3 shows a gaming coupon intended to be processed by the device according to the invention.

Represented in FIG. 3 is a loto gaming coupon, which includes a gaming grid 20 containing numerals printed in the same color (in this embodiment, red) as LED 10 of the image detector 1. Also printed in red is an upper zone 21, indicating the day and period of coupon validity. To the left of this zone, the word "LOTO" is printed on a blue background with respect to the letters "L" and "T" and on a red background with respect of the letters "O".

The coupon also includes a lower zone 22 with a red background on which appears, in white, the inscription "6 out of 49" indicating the number of numerals to be marked.

All other zones of the coupon are printed in colors other than red, which allow them to be detected by the analysis device. These zones include alignment tags 23 and 24, an identification code 25 (designating the type of game), and inscriptions 26 indicating the number of draws and the corresponding prize to be paid out, for example. Finally, cross marks 27 on the coupon, which have been made by the player, constitute the variable data.

Figure 4:
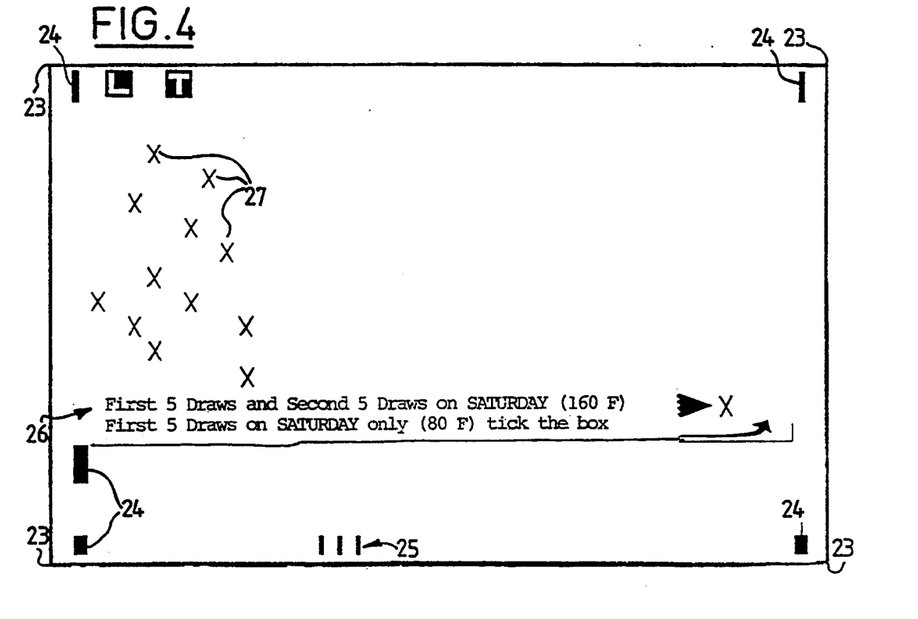
FIG. 4 shows the data of the gaming coupon of FIG. 3 which are picked out by the reading device according to the invention.

Represented in FIG. 4 is the coupon image of FIG. 3, resulting from an analysis of the device according to the invention and which appears on the display means associated with the latter. As FIG. 4 illustrates, all of the coupon regions printed in the color to which the device has been rendered blind (the color red in this embodiment), have disappeared from the coupon image and only the variable data consisting of the cross marks 27 made by the player remain. Similarly, the fixed data such as the alignment tags 23 and 24, the identification code 25, and the inscriptions 26 also remain.

As will be discussed later, the coupon image of FIG. 4 will be completed by superimposing a reconstructed game analysis marking pattern or grid onto it by processing unit 5 and 5a. This pattern or grid is identical to the coupon grid 20 of FIG. 3.

Figure 5:
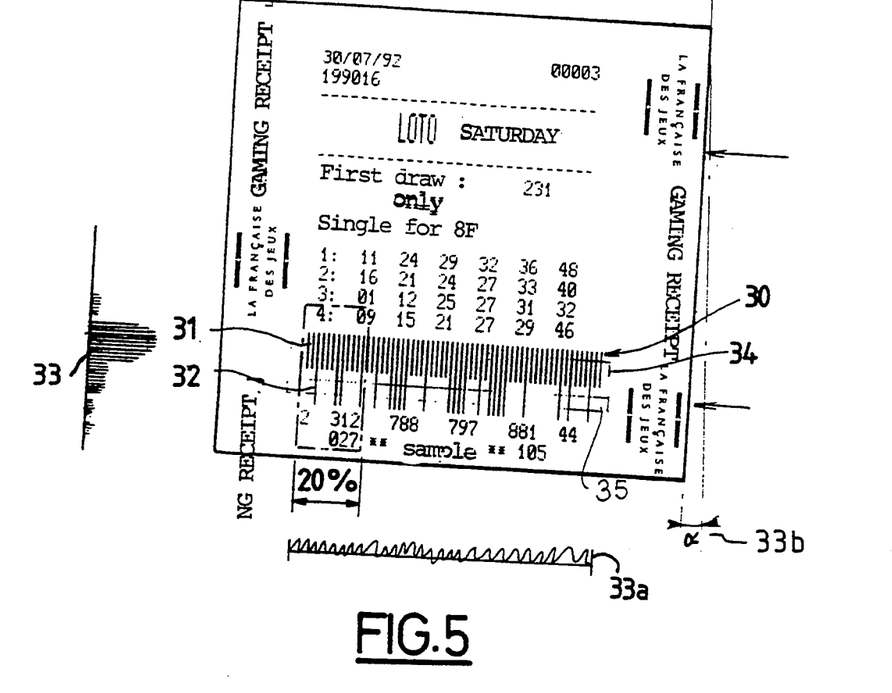
FIG. 5 shows a receipt issued by the terminal and analyzed by the device according to the invention.

FIG. 5 illustrates a gaming receipt delivered to the player by the gaming terminal. The analysis device is also designed to ensure an accurate reading of the receipt.

Accordingly, the receipt includes a number of regions intended to be analyzed. In particular, there is a bar code region 30 used for validating the coupon presented by a player. This is achieved by comparing the code read from the receipt with a corresponding code stored in the central unit. This code, however, is sometimes printed with defects. Thus, code format and the analyzing device are designed to detect the codes with maximum accuracy.

The code consists of a first bar code part 31, which is a series of bars arranged at regular intervals that embody clock signals. A second bar code part 32 is another series of bars defining data signals that correspond to the proper validation code. To the left of the receipt, a histogram 33 of the bar code is generated by the analysis device, which is used for calculating the separation between the clock signals and the data signals. Under the lower edge of the receipt, a horizontal histogram 33a is used for calculating an angle of inclination 33b, α, of the receipt.

Analysis of the receipt is ensured by sweeping two rectangular sectors 34 and 35 of bar code parts 31 and 32. The positions of the sectors 34 and 35 are chosen on each side of the line of separation between the clock signals and data signals.

Figure 6:
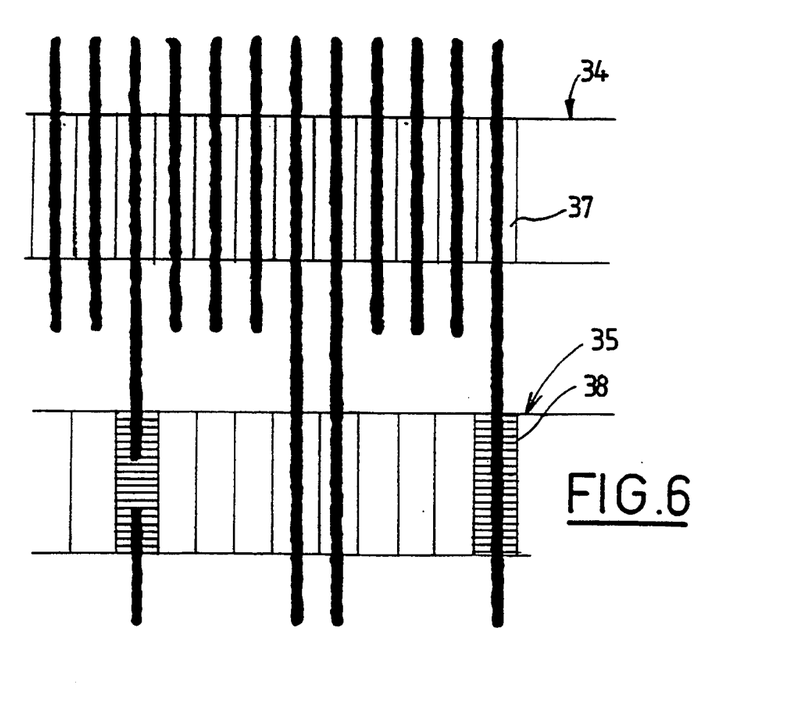
FIG. 6 is a view of the bar code of the receipt of FIG. 5 on a larger scale, showing the mode of analysis of the said code according to the invention.

As represented in FIG. 6, the sector 34 of the bar code part 31 embodying the clock signals also has adjacent windows 37, surrounding a portion of each bar. Similarly, in sector 35 of bar code part 32, the corresponding data signals also have windows 38 surrounding each possible location of a portion of bar. The presence or absence of a bar in each window 38 is determined through line-by-line sweeping.

The sweeping takes into account the presence of printing defects, such as gaps in a bar's continuity. It is generally accepted by convention that the detection of a majority of the points (for example, 60%) that constitute a bar confirms the presence of the bar. Accordingly, the analysis device takes this into account while analyzing the code.

The counting of the data signals is carried out by performing a logical AND operation between a clock bar and a data bar, which may possibly lie opposite this clock bar. That is, the simultaneous presence of a clock bar and a data bar induces the issuing of a logic 1, while the presence of a clock bar and the absence of a data bar induces the issuing of a logic 0. In this manner, the receipt validation number is reconstructed with a high degree of accuracy.

The executing of an analysis operation, with the aid of the device according to the invention, will now be described with reference to the flowcharts of FIGS. 7 and 8.

Figure 7:
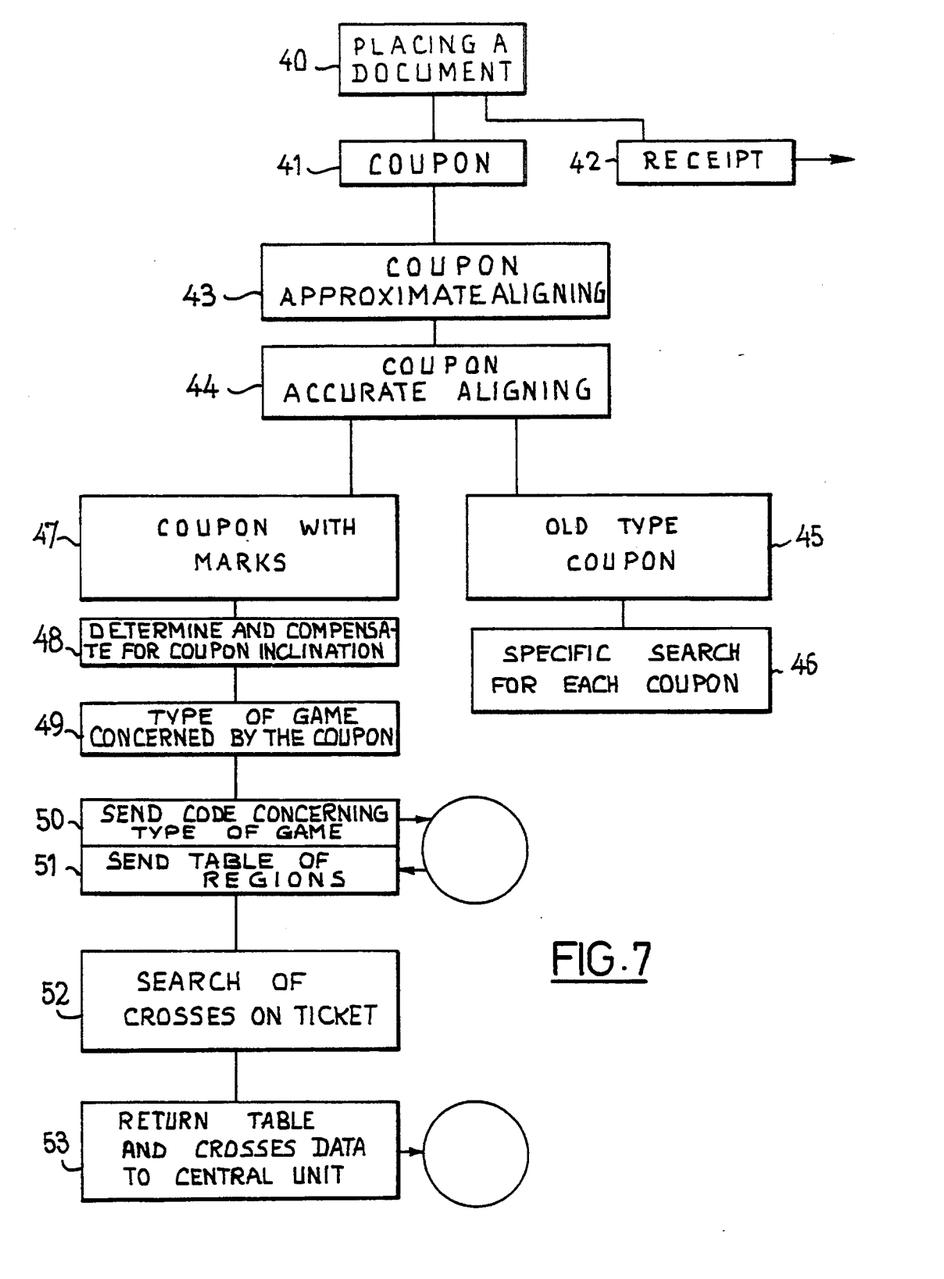
FIG. 7 is a flowchart illustrating tile operation of the analysis device, according to the invention for a gaming coupon.
Figure 8:
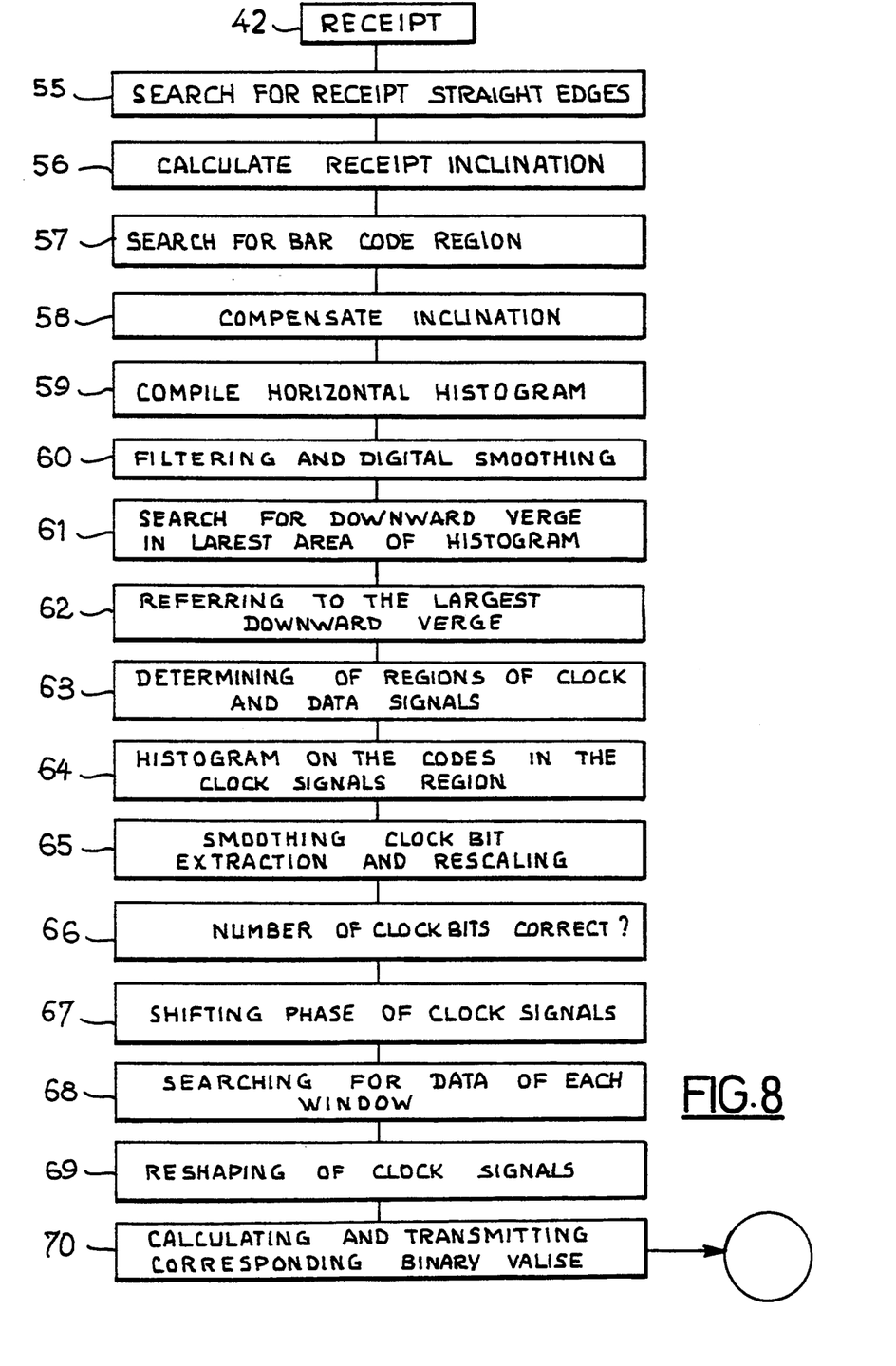
FIG. 8 is a flowchart illustrating the operation of tile analysis device for a receipt.

The placing of a document on the analysis device is performed in phase 40, FIG. 7. The sweeping operation is triggered by the insertion of the document 3 between the roller 2, and the image detector 1. As represented in FIG. 2, the plane of symmetry of the roller 2 is perpendicular to the transparent wall 13 of the image detector 1 and is offset with respect to the optical axis of the set of light conductors 14. Thus, once the document 3 is engaged between the roller 2 and the image detector 1, the light originating from the LED 10 is reflected.

In order to reduce reading errors, the parallelism between the edge of the document 3 and the rows of LED 10 is checked by requiring that a minimum number of the photosensitive elements 16 receive the light reflected by the edge of the document 3 in order to accept the position of the document 3. That is, the analysis device checks to see if the defect in parallelism, with respect to the row of LED 10, is tolerable. This parallelism may also be checked by determining a minimum distance between two illuminated photosensitive elements 16. The minimum number of, or distance between two elements 16, differs depending on the transverse dimension of the document 3 analyzed.

When the parallelism is within a tolerated range, the processing unit 5 actuates the stepper motor for driving the roller 2, and line-by-line reading of the document is performed.

Next, a determination of whether the document 3 is a gaming coupon or a receipt is made by means of the detectors 17 and 18 during phases 41 and 42. If the document 3 is a receipt, its processing will be examined with reference to FIG. 8.

If, however, the document is a gaming coupon, the edges of the coupon which are embodied through eight tags 23 (FIGS. 3 and 4), are searched in phase 43, to approximately align the coupon.

After the aligning is carried out, a second search is performed of the alignment tags 24 (FIGS. 3 and 4) for accurate alignment of the coupon, in phase 44. If the presented coupon does not include any alignment tags 24, the analysis in phase 45 establishes that the coupon examined is an old type and requires a specific search of each coupon, embodied in phase 46.

If alignment tags 24 are detected, phase 47 establishes that the coupon presented can be processed by the analysis device. During phase 48, the inclination 33$b$, $\alpha$, of the coupon with respect to the generatrix of the roller 2 is established, and the processing unit 5 compensates for the inclination 33$b$, $\alpha$. Next, in phase 49, the coupon is searched for the identification code 25 (FIGS. 3 and 4), which indicate the type of game to which the coupon belongs.

During phase 50, the identification code 25 is sent to the central unit, which has various information items relating to the gaming grids stored in its memory. In response, in phase 51, the central unit sends back a table of regions.

During phase 52, the analysis system searches for the variable dam. That is, the cross marks 27 that are written on the coupon by the player are recognized by the analysis system in the corresponding regions.

During phase 53, the information relating to the table and the cross marks 27, embodied by their coordinates, are sent to the central unit. The recording of the data relating to the coupon is then complete.

The processing of a receipt will now be described with reference to the flowchart of FIG. 8. After having established, during phase 42, that the document inserted into the analysis device is a receipt, the parallelism of the receipt edge with the row of LED 10 is searched for during phase 55.

Then, during phase 56, the receipt inclination 33$b$, $\alpha$, is calculated, followed by a search for bar code region 30, phase 57. The analysis device then compensates the receipt inclination 33$b$, $\alpha$, in phase 58.

During phase 59, approximately 20% the bar code region 30 is compiled into a horizontal histogram 33$a$. This histogram is enhanced by filtering and digital smoothing in phase 60.

During phase 61, a search is made for the downward verge in the largest area of the graph of the histogram 33 (FIG. 5). In phase 62, this verge which corresponds to the center of the bar code is located.

During phase 63, the bar code regions 31 and 32 (FIG. 5), representing the clock and data signals, respectively are determined.

During phase 64, the histogram relating to the bar code region 31 (clock signals) is compiled.

During phase 65, the smoothing and extraction of the clock bits is performed. Rescaling is achieved by compiling an average. Next, the number of clock signals is checked during phase 66. If the number is not correct, the receipt is regarded as being illegible and is rejected.

The analysis continues to phase 67, if the number is correct. Using the clock signals, the regions for sampling the data (the adjacent windows 37), are determined by shifting the phase of the clock signals by half a period,.

During phase 68, the data in each adjacent data window region 38, corresponding with its clock adjacent window 37 is searched. Data is recognized as present by using a discrimination threshold and by regarding, as valid data, the presence of a specified fraction (for example, two thirds) of the total number of points which constitute the data bar.

During phase 69, the clock signals are reshaped. That is, a four bit by four bit reformatting of the clock signals is achieved. For example, a receipt with fifteen clocks, is represented by fifteen times four bits, or 60 bits total.

During phase 70, the corresponding binary value is calculated and is transmitted to the central unit. Thus, the examination of the validation numeral of the receipt is thus complete.

The operation of the entire analysis device according to the invention will be discussed with reference to FIGS. 1 and 2. When the detectors 17 and 18 detect the presence of a document 3 at the input of the device, the information is transmitted to the processing unit 5, which monitors the analyzing device and the stepper motor 4. The processing unit 5 then activates the LED 10 (FIG. 2) and the scanning of the document 3 is commenced.

When the parallelism of the edge of the document 3 with the row of LED 10 is within tolerance, the processing unit 5 controls the stepper motor 4 such that a line in the document is analyzed after each step advance of the roller 2.

The processing unit 5 continues in this manner by using the signals delivered by the detectors 17 and 18, and the circuit 19 (the detection system) for determining whether part of the document 3 still needs to be analyzed.

Once the detection system no longer sees any document at the input, it transmits an absence of document signal to the processing unit 5. The processing unit 5 then calculates the difference in position between the line currently being analyzed and the back edge of the document 3, thus establishing the number of steps which the stepper motor 4 must be advanced to complete the analysis. In this embodiment, the image is analyzed line-by-line with a resolution of 40 steps per cm. Each line possesses a resolution of 80 steps per The vertical resolution can be modified by modifying the transmission ratio between the output shaft of the stepper motor 4 and the document drive roller 2. The vertical resolution depends on the construction of the image detector 1.

During the image sweeping of the document 3, the image data is analyzed and transmitted by the processing unit 5 to the data memory 6 for temporary storage. This data is then subsequently transmitted to the central unit associated with the analysis device of this invention.

In this embodiment, the light source of the image reader is formed by a set of LED 10, which emit red light with a wavelength of 650 to 670 nanometres.

Another embodiment of the present invention, has a first set of elements for filtering a first color, associated with a first set of LED, and a second set of elements for filtering at least one other color, associated with a second set of LED. Thus, achieving an analysis device blind to two or more colors.

Still another embodiment of the present invention, has discharge tubes emitting monochromatic light directly, or else associated with an appropriate filtering element, instead of LED.

We claim:

1. A device for analyzing information carriers, especially gaming coupons or receipts, comprising:
   means for inserting the carrier;
   means for reading the information on the carrier; and
   means for processing the information read from the carrier with a view to its conversion into digital data and its transmission to a central gaming management unit,
   wherein the means for reading the information on the carrier comprise an optical reader which is blind to a single color for the whole of the analysis and in which color fixed information is printed on the coupon and which the reader is sensitive to other colors, so as to take into account only the variable gaming information and the fixed information for aligning the coupon and for designating the type of game to which it belongs, which information is printed in these other colors and in that,
   the processing means comprise, for analyzing gaming coupons, means of generating marking patterns corresponding to the type of game to which the coupon belongs with a view to the reconstructing of the coupon's regions to be analyzed by superimposing on the variable data and on the fixed alignment and game type data, fixed marking patterns data to which the image reader has been rendered blind.

2. The device according to claim 1, wherein tile optical reader comprises:
   a linear light source, extending over the transverse dimension of the document to be analyzed and photosensitive elements situated in the path of the light emitted by the source and reflected by the document to be analyzed, characterized in that the light source comprises a single monochromatic light source whose color is that in which the fixed information not having to be taken into account by the device is printed, the source illuminating the whole of the document independently of the function of the information which it bears.

3. The device according to claim 2, wherein the monochromatic light source comprises a series of light-emitting diodes emitting monochromatic beams.

4. The device according to claim 3, wherein the light-emitting diodes there are associated filtering and focusing elements consisting of thick lenses ensuring the overlapping between beams exiting from neighboring lenses so that the light emitted by the series of light-emitting diodes has the appearance of a continuous monochromatic luminous stroke.

5. The device according to claim 2, wherein the monochromatic light source consists of at least one discharge tube emitting in the color to which the device is blind and associated with a filter arranged in the path of the light between the source and the photosensitive elements.

6. The device according to claim 1, wherein tile processing means further comprises, means of reading bar codes corresponding to the validation numerals of the gaming coupons.

7. The device according to claim 1, further comprises:
   means for detecting the presence and the nature of the documents presented to the analysis device,
   wherein the means consist of at least two detectors arranged at a distance slightly greater than the dimension transverse to the direction of displacement of the document of smaller dimension to be analyzed, a detector being actuated by a document of smaller dimension and at least two detectors being actuated by a document of larger dimension, and in that the detectors are connected to a circuit for monitoring the control signals of the stepper motor for driving the roller of the analysis device and signals corresponding to the dimension and consequently to the nature of the document presented to the device with a view to the employing of corresponding means contained in the processing means.

8. The device according to one of claim 1, wherein the axis of the roller and the optical axis of the light conductors have an offset in the direction of insertion of a document in order to allow the front edge of this document to reflect the light emitted by the monochromatic light source, thus indicating the presence of the document.

9. The device according to claim 2, further comprising:

means for monitoring the parallelism of the edge of the document and of the linear light source by determining a minimum number of photosensitive elements having to receive the light reflected by the edge of the document or else a minimum distance between two illuminated photosensitive elements when placing the document in the device and for controlling the processing means so that they actuate the electric stepper motor for driving the roller when the monitoring of the parallelism indicates that the defect in parallelism between the document and the source is tolerable.

10. The device according to one of claim 2, further comprising:

means for monitoring the luminous intensity of the light source, which means are connected up to the processing means, itself linked to a comparator between a read signal relating to the brightness of the source and a threshold signal delivered by a signal source.

* * * * *